(12) United States Patent
Kim et al.

(10) Patent No.: US 7,776,964 B2
(45) Date of Patent: Aug. 17, 2010

(54) THERMOPLASTIC ABS RESIN COMPOSITION WITH IMPROVED IMPACT RESISTANCE, DIMENSIONAL STABILITY AND BLOW MOLDING PROPERTY

(75) Inventors: Bang Duk Kim, Bucheon-si (KR); Jae Ho Yang, Gunpo-si (KR); Tae Uk Kim, Suwon-si (KR)

(73) Assignee: Cheil Industries Inc., Gum-si (KR)

( * ) Notice: Subject to any disclaimer, the term of this patent is extended or adjusted under 35 U.S.C. 154(b) by 60 days.

(21) Appl. No.: 11/720,441

(22) PCT Filed: Mar. 31, 2005

(86) PCT No.: PCT/KR2005/000955

§ 371 (c)(1),
(2), (4) Date: May 30, 2007

(87) PCT Pub. No.: WO2006/059819

PCT Pub. Date: Jun. 8, 2006

(65) Prior Publication Data

US 2008/0167426 A1    Jul. 10, 2008

(30) Foreign Application Priority Data

Dec. 1, 2004    (KR) .................. 10-2004-0100014

(51) Int. Cl.
C08L 51/04    (2006.01)
C08F 36/00    (2006.01)
C08F 236/00    (2006.01)
C08F 20/44    (2006.01)

(52) U.S. Cl. .................. 525/71; 526/340; 526/335; 526/341

(58) Field of Classification Search .................. 525/71; 526/340, 335, 341
See application file for complete search history.

(56) References Cited

U.S. PATENT DOCUMENTS

| 4,430,478 | A | 2/1984 | Schmitt et al. |
| 4,713,420 | A * | 12/1987 | Henton .................. 525/236 |
| 4,874,815 | A | 10/1989 | Bubeck et al. |
| 5,605,963 | A | 2/1997 | Leitz et al. |
| 5,696,204 | A | 12/1997 | Eichenauer et al. |
| 6,211,298 | B1 | 4/2001 | Vanspeybroeck et al. |
| 2003/0092836 | A1 | 5/2003 | Herbert et al. |
| 2004/0054077 | A1* | 3/2004 | Chung et al. .................. 525/63 |

FOREIGN PATENT DOCUMENTS

| EP | 0190884 A2 | 8/1986 |
| EP | 1828272 B1 | 8/2009 |
| JP | 02175745 | * 7/1990 |
| KR | 1994-3476 B1 | 4/1994 |
| KR | 2002-77501 A | 10/2002 |
| KR | 396402 B1 | 9/2003 |
| KR | 2004-6120 A | 1/2004 |
| WO | WO89/05836 A1 | 6/1989 |
| WO | 2006059819 A1 | 6/2006 |

OTHER PUBLICATIONS

International Search Report for International Application No. PCT/KR2005/000955 mailed on Aug. 31, 2005.
European Search Report in corresponding European Application No. 05789552.6-2109, dated Aug. 5, 2008.
Database WPI Week 198440, Thomson Scientific, London, GB, 1984-247424, JP 59 149912, (Japan Synthetic Rubber Co. Ltd.) Autust 28, 1984, *abstract*.
Decision to Grant in counterpart European Patent Application No. 05789552.6, dated Jul. 30, 2009.

* cited by examiner

*Primary Examiner*—William K Cheung
(74) *Attorney, Agent, or Firm*—Summa, Additon & Ashe, P.A.

(57) ABSTRACT

The thermoplastic ABS resin composition according to the present invention comprises (a) 2 to 25 parts by weight of a graft copolymer particle containing rubbers having a volume average particle diameter range from 0.05 µm to less than 0.18 µm; (b) 2 to 25 parts by weight of a graft copolymer particle containing rubbers having a volume average particle diameter range from 0.18 µm to less than 0.4 µm; (c) 2 to 18 parts by weight of a graft copolymer particle containing rubbers having a volume average particle diameter range from 0.4 µm to less than 4 µm; (d) 10 to 70 parts by weight of a branched vinyl cyanide-vinyl aromatic copolymer; and (e) 1 to 60 parts by weight of a long-chain linear vinyl cyanide-vinyl aromatic copolymer.

10 Claims, No Drawings

THERMOPLASTIC ABS RESIN COMPOSITION WITH IMPROVED IMPACT RESISTANCE, DIMENSIONAL STABILITY AND BLOW MOLDING PROPERTY

CROSS REFERENCE TO RELATED APPLICATIONS

This application claims priority from PCT Application No. PCT/KR2005/000955, filed Mar. 31, 2005, pending, which designates the U.S. and which is hereby incorporated by reference in its entirety, and from Korean Patent Application No. 10-2004-0100014, filed Dec. 1, 2004, pending, which is also hereby incorporated in its entirety.

FIELD OF THE INVENTION

The present invention relates to a thermoplastic resin composition with improved impact resistance, dimensional stability and heat resistance as well as excellent extrusion and blow molding property. More particularly, the present invention relates to a thermoplastic ABS resin composition that comprises graft copolymer particles having rubbers with different range of particle sizes and two kinds of vinyl cyanide-vinyl aromatic copolymer.

BACKGROUND OF THE INVENTION

Recently, thermoplastic acrylonitrile-butadiene-styrene (hereinafter ABS) resin has been employed to materials for electric/electronic appliances, automobile parts and so on. The requirements which the materials have to meet include heat resistance, mechanical strength and dimensional stability. In particular, when the resin is molded through extrusion or blow molding process, the materials further require high melt modulus and elongation ratio and should not cause a phenomenon of draw-down of parrison.

It has been proposed to increase the amount of rubber content to improve the impact resistance of ABS resin. However, the molding compositions produced therefrom have inordinately high coefficient of linear thermal expansion, so that the dimensional stability of the resin is deteriorated. On the other hand, decreasing the amount of rubber content may cause crack formation due to poor impact resistance at low temperature. Inorganic fillers such as glass fiber may be used to improve dimensional stability, but this method is inadequate for the resins to be prepared by extrusion or blow molding process.

In order to improve impact strength, it is also known to blend polymer particles produced by different polymerization process, that is, to blend polymer particles produced in an emulsion polymerization process with particles produced in a continuous polymerization process (c.f. U.S. Pat. Nos. 4,430,478, 5,605,963 and 5,696,204). However, the resultant products exhibit low dimensional stability and poor extrusion and blow molding properties.

That is, in order to obtain good extrusion and blow molding property, it is important that the resin compositions have high melt modulus and elongation ratio, and exhibit high strain hardening effect and no parrison phenomenon occurs. However, the exacting requirements are not fulfilled by these compositions produced from the above references.

It is commonly known a method to minimize the rubber content and add N-substituted maleimide copolymer in order to provide good characteristics of heat resistance and dimensional stability to ABS resin. Though N-substituted maleimide copolymer confers improved heat resistance and low coefficient of linear thermal expansion, the use of N-substituted maleimide cannot provide sufficient impact resistance, so the application has been restricted.

Accordingly, the present inventors have developed a thermoplastic ABS resin composition having improved impact resistance, dimensional stability and heat resistance as well as excellent extrusion and blow molding property by introducing ABS copolymer particles having different rubber particle size to vinyl cyanide-vinyl aromatic copolymer in a specific ratio.

OBJECTS OF THE INVENTION

An object of the present invention is to provide a thermoplastic ABS resin composition having good impact strength, dimensional stability and heat resistance.

Another object of the present invention is to provide a thermoplastic ABS resin composition having excellent extrusion blow molding property.

Other objects and advantages of this invention will be apparent from the ensuing disclosure and appended claims.

SUMMARY OF THE INVENTION

The thermoplastic ABS resin composition according to the present invention comprises (a) 2 to 25 parts by weight of a graft copolymer particle containing rubbers having a volume average particle diameter range from 0.05 µm to less than 0.18 µm; (b) 2 to 25 parts by weight of a graft copolymer particle containing rubbers having a volume average particle diameter range from 0.18 µm to less than 0.4 µm; (c) 2 to 18 parts by weight of a graft copolymer particle containing rubbers having a volume average particle diameter range from 0.4 µm to 4 µm; (d) 10 to 70 parts by weight of a branched vinyl cyanide-vinyl aromatic copolymer; and (e) 1 to 60 parts by weight of a long-chain linear vinyl cyanide-vinyl aromatic copolymer.

The branched vinyl cyanide-vinyl aromatic copolymer is prepared by copolymerizing 15~50 parts by weight of a vinyl cyanide compound and 85~50 parts by weight of a vinyl aromatic compound in the presence of less than 1 part by weight of a polyfunctional compound and has a weight average molecular weight of 100,000~2,000,000. The branched vinyl cyanide-vinyl aromatic copolymer (d) can be used alone or in combination.

The sum of the amount of graft copolymer particle (a) and graft copolymer particle (b) is 5~35 parts by weight, and preferably (a)+(b)+(c) is 10~50 parts by weight. The detailed descriptions of the resin composition according to the present invention are as follows.

DETAILED DESCRIPTION OF THE INVENTION

(a) Graft Copolymer Particle Containing Rubbers having a Volume Average Particle Diameter Range from 0.05 µm to Less than 0.18 µm The graft copolymer particle containing rubbers having a volume average particle diameter range from 0.05 µm to less than 0.18 µm(a) of the present invention may prepared by continuous polymerization such as bulk-suspension, bulk-solution polymerization, conventional bulk polymerization or conventional emulsion graft polymerization.

Monomer mixture to be used for the preparation of the graft copolymer particle (a) comprises 15~35% by weight of a vinyl cyanide compound and 85~65% by weight of a vinyl aromatic compound.

The rubber to be used for the preparation of the graft copolymer particle (a) includes polybutadiene, polyisoprene, polychloroprene, a butadiene-styrene copolymer, a butadiene-acrylonitrile copolymer and so forth. Among them, polybutadiene, a butadiene-styrene copolymer, and a butadiene-acrylonitrile copolymer may be preferably used. The average rubber particle size of the graft copolymer particle is from 0.05 μm to less than 0.18 μm, preferably from 0.1 μm to less than 0.15 μm. In the present invention, two or more types of the rubbers having different average particle size can be used within the above range.

Examples of the vinyl cyanide compound for preparing the graft copolymer particle (a) include acrylonitrile, methacrylonitrile and the like. These vinyl cyanide compounds can be used alone or in combination.

Examples of the vinyl aromatic compound for preparing the graft copolymer particle (a) include styrene, α-methylstyrene, p-t-butylstyrene, 2,4-dimethylstyrene, vinyltoluene and the like. These vinyl aromatic compounds can be used alone or in combination.

(b) Graft Copolymer Particle Containing Rubbers Having a Volume Average Particle Diameter Range from 0.18 μm to Less than 0.4 μm The graft copolymer particle containing rubbers having a volume average particle diameter range from 0.18 μm to less than 0.4 μm (b) of the present invention may prepared by continuous polymerization such as bulk-suspension, bulk-solution polymerization, conventional bulk polymerization or conventional emulsion graft polymerization.

Monomer mixture to be used for the preparation of the graft copolymer particle (b) comprises 15~35% by weight of a vinyl cyanide compound and 85~65% by weight of a vinyl aromatic compound.

The rubber to be used for the preparation of the graft copolymer particle (b) includes polybutadiene, polyisoprene, polychloroprene, a butadiene-styrene copolymer, a butadiene-acrylonitrile copolymer and so forth. Among them, polybutadiene, a butadiene-styrene copolymer, and a butadiene-acrylonitrile copolymer may be preferably used. The average rubber particle size of the graft copolymer particle is from 0.18 μm to less than 0.4 μm, preferably from 0.2 μm to less than 0.35 μm. In the present invention, two or more types of the rubber having different average particle size can be used within the above range.

Examples of the vinyl cyanide compound for preparing the graft copolymer particle (b) include acrylonitrile, methacrylonitrile and the like. These vinyl cyanide compounds can be used alone or in combination.

Examples of the vinyl aromatic compound for preparing the graft copolymer particle (b) include styrene, α-methylstyrene, p-t-butylstyrene, 2,4-dimethylstyrene, vinyltoluene and the like. These vinyl aromatic compounds can be used alone or in combination.

(c) Graft Copolymer Particle Containing Rubbers Having a Volume Average Particle Diameter Range from 0.4 μm to 4 μm The graft copolymer particle containing rubbers having a volume average particle diameter range from 0.4 μm to 4 μm (c) of the present invention may prepared by continuous polymerization such as bulk-suspension, bulk-solution polymerization, conventional bulk polymerization or conventional emulsion graft polymerization.

Monomer mixture to be used for the preparation of the graft copolymer particle (c) comprises 15~35% by weight of a vinyl cyanide compound and 85~65% by weight of a vinyl aromatic compound.

The rubber to be used for the preparation of the graft copolymer particle (c) includes polybutadiene, polyisoprene, polychloroprene, a butadiene-styrene copolymer, a butadiene-acrylonitrile copolymer and so forth. Among them, polybutadiene, a butadiene-styrene copolymer, and a butadiene-acrylonitrile copolymer may be preferably used. The average rubber particle size of the graft copolymer particle is from 0.4 μm to 4 μm, preferably from 0.5 μm to 0.3 μm. In the present invention, two or more types of the rubber having different average particle size can be used within the above range.

Examples of the vinyl cyanide compound for preparing the graft copolymer particle (c) include acrylonitrile, methacrylonitrile and the like. These vinyl cyanide compounds can be used alone or in combination.

Examples of the vinyl aromatic compound for preparing the graft copolymer particle (c) include styrene, α-methylstyrene, p-t-butylstyrene, 2,4-dimethylstyrene, vinyltoluene and the like. These vinyl aromatic compounds can be used alone or in combination.

(d) Branched Vinyl Cyanide-Vinyl Aromatic Copolymer

The branched vinyl cyanide-vinyl aromatic copolymer (d) of the present invention is prepared by copolymerizing 100 parts by weight of a monomer mixture consisting of 15~50 parts by weight of a vinyl cyanide compound and 85~50 parts by weight of a vinyl aromatic compound with less than 1 part by weight of a polyfunctional compound.

The weight average molecular weight of the branched vinyl cyanide-vinyl aromatic copolymer (d) is preferably in the range of 100,000~2,000,000. It is preferable to have many long branches in the molecular structure.

Examples of the vinyl cyanide compound include acrylonitrile, methacrylonitrile and the mixture thereof. These vinyl cyanide compounds can be used alone or in combination. Examples of the vinyl aromatic compound include styrene, α-methylstyrene, p-t-butylstyrene, 2,4-dimethylstyrene, vinyltoluene and the mixture thereof. These vinyl aromatic compounds can be used alone or in combination. The vinyl cyanide-vinyl aromatic copolymer (d) of the present invention can be prepared by emulsion, suspension, solution and bulk polymerization.

The polyfunctional compound is selected from the group consisting of polyfunctional vinyl aromatic compound, triallyl isocyanurate, polyfunctional mercaptan, polyfunctional peroxide or derivatives thereof and a mixture thereof. As the polyfunctional vinyl aromatic compound, divinylbenzene is most preferred.

The branched vinyl cyanide-vinyl aromatic copolymer (d) of the present invention can be used in an amount of 10~70 parts by weight. If the amount is more than 70 parts by weight, the impact strength of the resin composition is decreased. If the amount is less than 10 parts by weight, blow and extrusion molding properties are decreased. The branched vinyl cyanide-vinyl aromatic copolymer (d) can be used alone or in combination.

(e) Long-Chain Linear Vinyl Cyanide-Vinyl Aromatic Copolymer

The long-chain linear vinyl cyanide-vinyl aromatic copolymer (e) of the present invention is prepared by copolymerizing 10-50 parts by weight of a vinyl cyanide compound and 90-50 parts by weight of a vinyl aromatic compound.

The weight average molecular weight of the long-chain linear vinyl cyanide-vinyl aromatic copolymer (e) is in the range of 50,000-2,000,000.

Examples of the vinyl cyanide compound include acrylonitrile, methacrylonitrile and the mixture thereof. These vinyl cyanide compounds can be used alone or in combination. Examples of the vinyl aromatic compound include styrene, divinylbenzene, α-methylstyrene, p-t-butylstyrene, 2,4-dimethylstyrene, vinyltoluene and the mixture thereof. These vinyl aromatic compounds can be used alone or in combination. The long-chain linear vinyl cyanide-vinyl aromatic copolymer (e) of the present invention may be prepared by emulsion polymerization, suspension polymerization, solution polymerization, bulk polymerization and so on.

Besides, when the graft copolymer particles (a), (b) and (c) are prepared by continuous polymerization such as bulk-suspension, bulk-solution polymerization, conventional bulk polymerization, the long-chain linear vinyl cyanide-vinyl aromatic copolymer (e) can be prepared together with the above graft copolymer particles, and can be also used in the present invention.

The long-chain linear vinyl cyanide-vinyl aromatic copolymer (e) of the present invention can be used in an amount of 1~60 parts by weight. If the amount is more than 60 parts by weight, blow and extrusion molding properties are decreased. If the amount is less than 1 part by weight, the mold surface of blow and extrusion mold becomes rough.

In the thermoplastic ABS resin composition of the present invention, the amount of graft copolymer particle containing rubbers having a volume average particle diameter range from 0.05 μm to less than 0.18 μm (a) is 2~25 parts by weight, graft copolymer particle containing rubbers having a volume average particle diameter range from 0.18 μm to less than 0.4 μm(b) is 2~25 parts by weight, and graft copolymer particle containing rubbers having a volume average particle diameter range from 0.4 μm to 4 μm (c) is 2~18 parts by weight based on 100 parts by weight of total resin composition.

Further, the sum of (a), (b) and (c) is 10~50 parts by weight. Preferably the sum of (a) and (b) is 5~35 parts by weight.

In case that the amounts of graft copolymer particles (a), (b) and (c) exceed the above ranges, the coefficient of linear thermal expansion is increased, and heat resistance is lowered. On the other hand, if the amounts of graft copolymer particles (a), (b) and (c) are less than the above ranges, the impact strength of the resin composition is reduced so that the product therefrom is of no practical use.

Other additives may be contained in the resin composition of the present invention. The additives include an impact modifier, an oxidation inhibitor, a lubricant, a light stabilizer, a filler, an inorganic additive, pigment and/or dye.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

Each component used in Examples and Comparative Examples was prepared as follow:

(a) Graft Copolymer Particle Containing Rubbers Having a Volume Average Particle Diameter Range from 0.05 μm to Less than 0.18 μm To 40 parts by weight of butadiene rubber was added a monomer mixture consisting of 20% by weight of acrilonitrile and 80% by weight of styrene to make 100 parts by weight, followed by grafting in emulsion polymerization to obtain graft copolymer particle of which the volume average diameter of rubber was 0.11 μm.

(b) Graft Copolymer Particle Containing Rubbers Having a Volume Average Particle Diameter Range from 0.18 μm to Less than 0.4 μm To 45 parts by weight of butadiene rubber was added a monomer mixture consisting of 18% by weight of acrilonitrile and 82% by weight of styrene to make 100 parts by weight, followed by grafting in emulsion polymerization to obtain graft copolymer particle of which the volume average diameter of rubber was 0.21 μm.

(c) ABS Resin Containing Graft Copolymer Particle Containing Rubbers having a Volume Average Particle Diameter Range from 0.4 μm to 4 μm To 15 parts by weight of butadiene rubber was added a monomer mixture consisting of 25% by weight of acrilonitrile and 75% by weight of styrene to make 100 parts by weight, followed by continuous polymerization to obtain ABS resin. The resultant ABS resin contained not only graft copolymer particle but also long-chain linear vinyl cyanide-vinyl aromatic copolymer (26% by weight of graft copolymer particle and 74% by weight of long-chain linear vinyl cyanide-vinyl aromatic copolymer). The volume average diameter of rubber of the graft copolymer particle was 0.52 μm. And the long-chain linear vinyl cyanide-vinyl aromatic copolymer contained 25% by weight of acrylonitrile and had a weight average molecular weight of 140,000.

(d) Branched Vinyl Cyanide-Vinyl Aromatic Copolymer

Both styrene-acrylonitrile copolymer containing 0.05 parts by weight of divinylbenzene and 100 parts by weight of monomer mixture consisting of 17 parts by weight of acrylonitrile and 83 parts by weight of styrene and having a weight average molecular weight of 150,000 and styrene-acrylonitrile copolymer containing 0.05 parts by weight of divinylbenzene and 100 parts by weight of monomer mixture consisting of 20% by weight of acrylonitrile and 80% by weight of styrene and having a weight average molecular weight of 1,500,000 were used simultaneously.

(e) Long-Chain Linear Vinyl Cyanide-Vinyl Aromatic Copolymer ($e_1$) The long-chain linear vinyl cyanide-vinyl aromatic copolymer prepared from the production of the above graft copolymer particle(c) was used.

($e_2$) A styrene-acrylonitrile copolymer resin containing 20% by weight of acrylonitrile and having a weight average molecular weight of 150,000 was used.

(f) PMI-Based Vinyl Cyanide-Vinyl Aromatic Copolymer

A styrene-acrylonitrile copolymer resin containing 50 parts by weight of N-phenylmaleimide(PMI) and 100 parts by weight of monomer mixture consisting of 20 parts by weight of acrylonitrile and 80 parts by weight of styrene, and having a weight average molecular weight of 200,000 was used.

Examples 1~4

The components as shown in Table 1 were mixed and the mixture was extruded through a twin screw extruder with L/D=29 and Φ=45 mm in pellets. The cylinder temperature of the extruder was kept at 250° C. Test specimens for flowability and physical properties were prepared. Test specimens for measuring the coefficient of linear thermal expansion were prepared in a size of 1.0×1.0×0.6 cm. The test specimens were subjected to biaxial drawing to inspect the strain-hardening and compare the elongation ratio.

Comparative Example 1

Comparative Example 1 was conducted in the same manner as in Example 1 except that ABS resin(c) which contains graft copolymer particle containing rubbers having a volume average particle diameter range from 0.4 μm to 4 μm was not used, but made the total content of rubber same as that of Example 1.

Comparative Example 2

Comparative Example 2 was conducted in the same manner as in Example 1 except that ABS resin (c) which contains graft copolymer particle containing rubbers having a volume average particle diameter range from 0.4 μm to 4 μm was not used, and increase the total content of rubber.

Comparative Example 3

Comparative Example 3 was conducted in the same manner as in Example 3 except that a styrene-acrylonitrile copolymer resin containing 20% by weight of acrylonitrile and having a weight average molecular weight of 150,000($e_2$) was used instead of branched vinyl cyanide-vinyl aromatic copolymer(d). The total amount of long-chain linear vinyl cyanide-vinyl aromatic copolymer of Comparative Example 3 exceeded 60 parts by weight.

Comparative Example 4

Comparative Example 4 was conducted in the same manner as in Example 4 except that a PMI-based vinyl cyanide-vinyl aromatic copolymer(f) was used instead of styrene-acrylonitrile copolymer resin containing 20% by weight of acrylonitrile and having a weight average molecular weight of 150,000($e_2$).

For the test specimens prepared according to the above examples, physical properties were measured as follow:

(1) Notch Izod Impact Strength: The notch Izod impact strength was measured in accordance with ASTM D256(¼" notched, 23° C.).

(2) Melt Flow Index: The melt flow index was determined in accordance with ISO 1133 (10 kg, 220° C.).

(3) Heat Distortion Temperature (HDT): The heat distortion temperature was measured according to ASTM D648 (¼", 120° C./hr) under 18.5 kgf/cm².

(4) Coefficient Of Linear Thermal Expansion: The coefficient of linear thermal expansion was measured by thermo-mechanical analyzer (TMA), varying the temperature from 30 to 80° C. at the rate of 10° C./min.

(5) Elongation Ratio: The elongation ratio was calculated by measuring the increased value after biaxial drawing at 200° C. and compared the increased value to that of Example 1.

(6) Strain-Hardening: The strain-hardening was evaluated with naked eye. ○ means that the strain-hardening effect is string, Δ means that the strain-hardening effect is weak, x means that the strain-hardening effect is none.

The test results of Examples 1-5 and Comparative Examples 1-5 are shown in Table 2.

TABLE 2

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Impact strength | 26 | 25 | 28 | 22 | 19 | 25 | 27 | 19 |
| melt flow index | 2.3 | 2.5 | 2.3 | 3.9 | 1.8 | 7.5 | 3.0 | 3.7 |
| HDT | 95 | 94 | 95 | 95 | 94 | 89 | 93 | 97 |
| coefficient of linear thermal expansion | 90 | 94 | 90 | 91 | 88 | 101 | 91 | 90 |
| elongation ratio | 1.00 | 0.92 | 1.00 | 0.99 | 1.97 | 0.91 | 0.80 | 0.95 |
| strain hardening | ○ | Δ | ○ | ○ | ○ | Δ |  | ○ |

As shown in Table 2, the compositions in Examples 1~4 show improved impact strength, coefficient of linear thermal expansion and heat resistance in comparison to Comparative

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| (a) graft copolymer particle | 23 | 12 | 17 | 8 | 22 | 30 | 17 | 8 |
| (b) graft copolymer particle | 12 | 8 | 8 | 7 | 19 | 20 | 8 | 7 |
| (c) ABS resin | 20(5.2)* | 60(15.6)* | 45(11.7)* | 51(13.26)* | — | — | 45(11.7)* | 51(13.26)* |
| (d) branched SAN | 30 | 20 | 30 | 30 | 30 | 20 | — | 30 |
| (e) long-chain linear SAN ($e_1$) ($e_2$) | (14.8)** 15 | (44.4)** — | (33.3)** — | (37.74)** 4 | — 29 | — 30 | (33.3)* 30 | (37.74)* — |
| (f) PMI containing SAN | — | — | — | — | — | — | — | 4 |

(The unit of rubber content is %, and the unit of each component is part by weight;
( )* is the amount of graft copolymer particle containing rubber having a volume average particle diameter range from 0.4 μm to 4 μm contained in ABS resin(c);
( )** is the amount of long-chain linear vinyl cyanide-vinyl aromatic copolymer contained in ABS resin(c))

Examples 1~4. The melt flow indexes of all Examples except Comparative Example 2 fell within the range of 1~5 which is a necessary value in normal blow molding.

Though the resin compositions of Example 1 and Comparative Example 1 contain the same amount of rubber, Comparative Example 1 shows lower impact strength than Example 1. This illustrates that the usage of distinct groups of rubber particles having a different average particle is effective to increase the impact strength of the resin composition.

Comparative Example 2 which contains larger amount of rubber content by increasing the amount of (a) and (b) shows extremely high melt index and low heat resistance, which means that the resin composition is inadequate for blow molding and that the materials therefrom is unfit for automobile parts. Further, Comparative Example 2 exhibits high coefficient of linear thermal expansion due to high content of rubber, which causes poor dimensional stability.

Comparative Example 3 in which a styrene-acrylonitrile copolymer resin containing 20% by weight of acrylonitrile and having a weight average molecular weight of 150,000($e_2$) was used instead of branched vinyl cyanide-vinyl aromatic copolymer(d), shows low elongation ratio and poor strain hardening, which results in bad moldability.

Comparative Example 4 in which PMI-based vinyl cyanide-vinyl aromatic copolymer(f) was used instead of styrene-acrylonitrile copolymer resin ($e_2$) shows considerably low impact strength, which illustrates that the resin composition of the present invention has sufficient heat resistance, so that the PMI-based vinyl cyanide-vinyl aromatic copolymer which adversely affect the impact strength of the resin is not required in the present invention.

The present invention can be easily carried out by an ordinary skilled person in the art. Many modifications and changes may be deemed to be with the scope of the present invention as defined in the following claims.

What is claimed is:

1. A thermoplastic ABS resin composition comprising:
   (a) 2 to 25 parts by weight of a graft copolymer particle comprising rubber having a volume average particle diameter ranging from 0.05 μm to less than 0.18 μm;
   (b) 2 to 25 parts by weight of a graft copolymer particle comprising rubber having a volume average particle diameter ranging from 0.18 μm to less than 0.4 μm;
   (c) 2 to 18 parts by weight of a graft copolymer particle comprising rubber having a volume average particle diameter ranging from 0.4 μm to 4 μm;
   (d) 20 to 70 parts by weight of a branched vinyl cyanide-vinyl aromatic copolymer; and
   (e) 1 to 60 parts by weight of a long-chain linear vinyl cyanide-vinyl aromatic copolymer,
   wherein each of graft copolymer particles (a), (b), and (c) comprises butadiene.

2. The thermoplastic ABS resin composition of claim 1, wherein said branched vinyl cyanide-vinyl aromatic copolymer (d) is prepared by copolymerizing 100 parts by weight of a monomer mixture comprising 15 to 50 parts by weight of a vinyl cyanide compound and 85 to 50 parts by weight of a vinyl aromatic compound with less than 1 part by weight of a polyfunctional compound and has a weight average molecular weight of 100,000 to 2,000,000.

3. The thermoplastic ABS resin composition of claim 1, wherein the sum of the amount of graft copolymer particles (a) and (b) is 5 to 35 parts by weight, and the sum of the amount of graft copolymer particles (a), (b) and (c) is 10 to 50 parts by weight.

4. The thermoplastic ABS resin compositions of claim 1, wherein said graft copolymer particle (a) comprises rubbers having a volume average particle diameter ranging from 0.1 μm to less than 0.15 μm, said graft copolymer particle (b) comprises rubbers having a volume average particle diameter ranging from 0.2 μm to less than 0.35 μm and said graft copolymer particle (c) rubbers having a volume average particle diameter ranging from 0.5 μm to 3 μm.

5. The thermoplastic ABS resin composition of claim 1, wherein all or part of said graft copolymer particles (a), (b) and (c) comprise two or more of said rubbers having different average particle sizes.

6. The thermoplastic ABS resin composition of claim 1, wherein said graft copolymer particles (a), (b) and (c) are prepared from a monomer mixture comprising a vinyl cyanide compound and a vinyl aromatic compound.

7. The thermoplastic ABS resin composition of claim 1, wherein said vinyl cyanide compound is acrylonitrile or methacrylonitrile; and said vinyl aromatic compound is selected from the group consisting of styrene, α-methylstyrene, p-t-butylstyrene, 2,4-dimethylstyrene and vinyltoluene.

8. The thermoplastic ABS resin composition of claim 1, wherein said branched vinyl cyanide-vinyl aromatic copolymer (d) is prepared by using a polyfunctional compound selected from the group consisting of a polyfunctional vinyl aromatic compound, triallyl isocyanurate, polyfunctional mercaptan, a polyfunctional peroxide, derivatives thereof and mixtures thereof.

9. The thermoplastic ABS resin composition of claim 1, wherein said butadiene comprises at least one of polybutadiene, butadiene-styrene copolymer or butadiene-acrylonitrile copolymer.

10. The thermoplastic ABS resin composition of claim 1, wherein said graft copolymer (c) comprises at least a portion of said linear vinyl cyanide-vinyl aromatic copolymer.

* * * * *